Jan. 6, 1959   E. R. BILLINGTON   2,867,234
PRESSURE REGULATOR SAFETY VALVE
Filed Feb. 14, 1951   2 Sheets-Sheet 1

Inventor:
Evans R. Billington
By: Harbaugh and Hinrichs
Attys.

Jan. 6, 1959 E. R. BILLINGTON 2,867,234
PRESSURE REGULATOR SAFETY VALVE
Filed Feb. 14, 1951 2 Sheets-Sheet 2
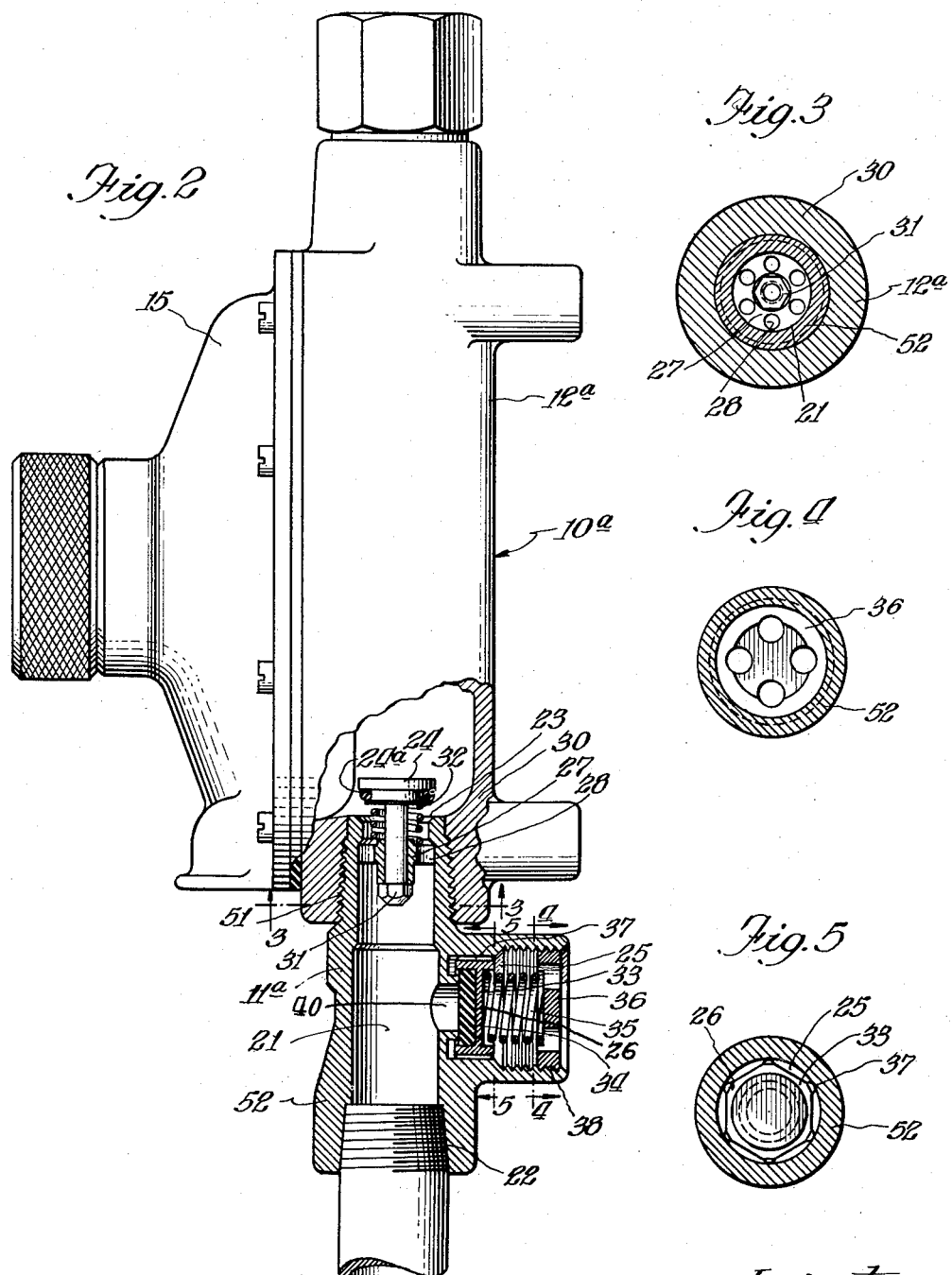
Inventor:
Evans R. Billington
By: Harbaugh and Hinrichs
Atty's.

United States Patent Office 2,867,234
Patented Jan. 6, 1959

2,867,234

PRESSURE REGULATOR SAFETY VALVE

Evans R. Billington, Chicago, Ill., assignor to The Bastian-Blessing Company, Chicago, Ill., a corporation of Illinois Application February 14, 1951, Serial No. 210,940

4 Claims. (Cl. 137—505.11)

This invention relates generally to systems for dispensing and distributing fluid under pressure, and more particularly to systems such as those supplying household appliances with fuel gas.

The invention contemplates the use of a safety device for preventing the occurrence of excessive gas pressures in such systems at the appliances up to the point of cutting off the flow of gas to the appliances if conditions develop which would otherwise result in excessive pressures occurring at the appliances.

The safety device of this invention not only can be used with like results in handling liquids as well as gaseous fluids, but also operates to prevent the flow of fluid through a conduit leading to an appliance from exceeding a predetermined maximum rate by stopping the flow if and when the maximum rate is exceeded.

Although the safety device of this invention may be used in many applications as a fluid flow control device in almost any conduit, it is particularly useful when used in association with, or as a part of, a pressure regulator in a fuel gas dispensing system.

Accordingly the device will be described herein as used in a gaseous fuel dispensing system where fuel is supplied at a service pressure of approximately eleven inches of water column to gas burning appliances.

The conventional practice in dispensing fuels such as liquefied butane or propane from a container is to allow the liquid fuel to vaporize either with or without an initial pressure reduction and to deliver the fuel in its vapor phase to a service pressure reducing regulator of the diaphragm type. The outlet of the regulator in turn is connected to a service conduit which conducts the fuel gas to the various appliances burning the fuel.

Such regulators usually comprise a chamber having a wall formed by a flexible diaphragm and an inlet valve controlled by the diaphragm for introducing gas into the chamber. A mechanical linkage is provided between the diaphragm and the valve member to operate the valve by movement of the diaphragm. Normally the valve of the regulator is opened by spring pressure and the fluid pressure in the chamber working against the diaphragm closes the valve. A service line for appliances is connected directly to the chamber so that the service pressure in the service line is substantially the same as the regulated pressure within the chamber.

In the event that the diaphragm is ruptured, or the inlet valve fails to close for any one of a number of reasons including dirt between the valve member and seat and seat deterioration, the pressure in the chamber and the service line is no longer controlled by the diaphragm and the pressure in the chamber may rise to a point as high as the pressure of the gas supplied to the regulator. A rise of pressure in a service line supplying fuel to appliances such as stoves, furnaces or water heaters, is very dangerous. Most of the appliances are provided with pilots which must remain lit at all times. If the service pressure exceeds the rated operating pressure of the pilot, the accompanying excessive gas velocity at the flame orifice will elongate the flame to dangerous proportions and even extinguish it should the velocity exceed the rate of flame propagation.

In any device intended to prevent or safeguard against such situations arising, it is necessary that there be no interference with the maximum flows necessary for normal operation of the appliances being served. Furthermore, the device must stop the flow of gas into the service line to prevent excessive pressures at the appliances. Considering these circumstances, an excess flow valve alone would not be satisfactory since the pressure buildup would be slow enough to keep the check disc in equilibrium and not effect the movement necessary for closure. On the other hand, a relief valve in itself would not be adequate since certain failures could cause a very high rate of discharge into the service line. A safety relief valve large enough to relieve pressures built up in the service line by such a high rate of discharge would be of such a size and cost that its use would be impractical.

The present invention contemplates a device designed primarily as a safety unit which can be readily inserted or incorporated in service lines of conventional domestic and industrial fuel systems at low cost, cost and reliability in operation under all conditions being of prime importance.

The problem is a long existing one. In such systems as those considered here it is very important that the pressure in the service line be held very close to a predetermined value at all times and that it never be allowed to exceed a certain safe maximum value. The practice heretofore has been to provide a pressure relief valve in the regulator, usually incorporated with the diaphragm, to prevent the accumulation of excess pressure. Such valves, however, are not effective in all cases in that the secondary escape ports or vents in the bonnet of the regulator are too small to handle the volume of gas which would have to be handled to maintain a satisfactory low pressure in the service line should the diaphragm fail completely.

Accordingly, one object of this invention is to provide a safety device which not only operates to reduce the service pressure immediately should it exceed a predetermined value, but also shuts off all flow to the service line when an excessive pressure or flow occurs. The quick release of excess pressure beyond the excess flow valve develops a quick and momentary excess flow of gas localized at the excess flow check valve which snaps the valve to its cut off position.

Another important object is to provide a safety device which can be used on the outlet of a regulator or as an integral part thereof, and which is effective in preventing excessive pressures or flows in the service line connecting the regulator to appliances.

Another object is to provide a safety device of sufficient capacity to accommodate the maximum demand on the regulator required by the appliance or appliances supplied by the regulator, yet be effective to cut off the flow at much less than maximum demand if pressures become dangerous.

Another object is to provide a safety device which also functions as an excess flow check valve to shut off all flow in the event of rupture of the service line or an inadvertent disconnection of an appliance.

A further object of this invention is to provide a safety device which may be used in any fluid flow system with or without a pressure regulator to guard against too high a pressure and too fast a flow.

A further object is to provide safety devices which will operate safely under all service conditions which may be experienced in field operations, which safety device can be simply and inexpensively fabricated.

Other objects and advantages of the safety device of this invention will present themselves, on reading the following specification in conjunction with the drawings and the appended claims.

In the drawings:

Fig. 2 is a side view of a regulator provided with a modified form of the safety device of this invention;

Fig. 3 is a section taken on line 3—3 of Fig. 2;

Fig. 4 is a section taken on line 4—4 of Fig. 2;

Fig. 5 is a section taken on line 5—5 of Fig. 2; and

A fundamental concept of this invention is to provide an inexpensive flow controller which instantly prevents excessive pressures and flows from developing in the service line, yet does not interfere with service conditions while the system is operating normally.

In doing this, an excess flow check valve is located in the conduit on the up-stream side of and close to the safety valve and is set to close at a rate of flow slightly in excess of the maximum load which the conduit is expected to carry. The safety valve, which is one comparatively small in size, is adjusted to open and vent the conduit should the pressure rise beyond a predetermined safe maximum. Thus, if for any reason the conduit pressure rises to an unsafe value, the safety valve pops open to vent the conduit and immediately on the opening of the safety valve the rate of flow through the conduit suddenly increases beyond the setting of the excess flow check valve and thereby triggers a closure of the excess flow valve to stop the further flow of gas into the conduit.

Figure 1:
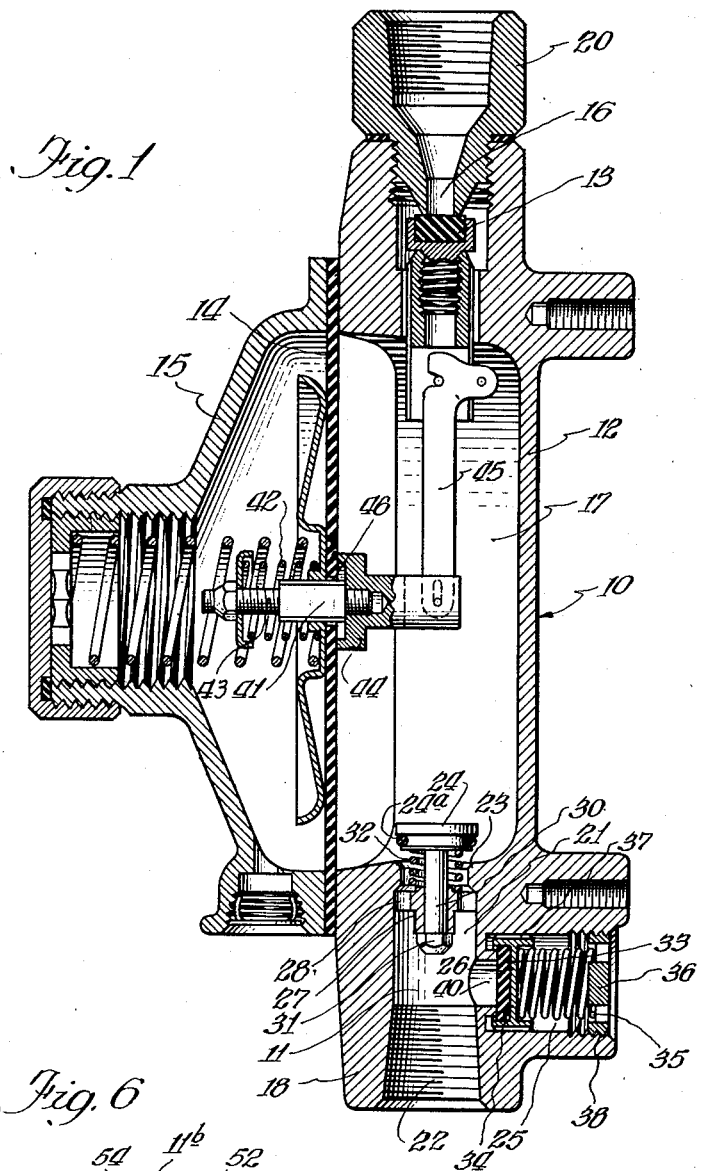
Fig. 1 is a vertical section of a regulator having the safety device of this invention incorporated therein.

In Fig. 1 a regulator 10 provided with the safety device 11 of this invention is shown. In addition to the safety device 11, the regulator 10 comprises a body 12, an inlet valve 13, a flexible diaphragm 14 and bonnet 15. With the exception of the safety device 11 the regulator is of a conventional design and functions in the normal manner to control the rate of flow of gas through the inlet port 16 to maintain a substantially constant pressure in the chamber 17.

The safety device 11 is built into the body 12, the mechanism being compactly arranged in an outlet boss 18 on the opposite side from the inlet fitting 20. A passageway 21 extends through the boss 18 to the chamber 17. The outer end of this passageway is provided with threads 22 for connection of the service line and the inner end is beveled to provide a port 23 for the excess flow valve member 24. A second passageway 25 connects the passage 21 to the atmosphere and houses the safety valve member 26.

The inner end of the outlet passage 21 is machined to provide an integral valve guide 27. This guide is surrounded by a plurality of holes 28 through which the gas may flow. An axial hole is drilled through the guide 27 to accommodate the stem 30 of the excess flow check valve 24, the clearance being such that the stem is freely slideable in the hole. The valve member 24 is threadably attached to one end of the stem 30, and a retaining nut 31 is threaded onto the opposite end of the stem to retain the valve in the position shown. To produce a gas tight seal when the valve 24 is closed an elastomer ring 24a is provided on the valve member which seats against the port 23.

A helical valve spring 32 surrounds the stem 30 and bears against the guide 27 and the valve 24 to urge the latter away from the port 30. Normally the excess flow valve is in the open position allowing an unrestricted flow of gas up to a predetermined amount. The relationship of the above described parts may be readily understood by reference to Fig. 3 where like numbers refer to like parts.

The excess flow valve mechanism is, broadly speaking, of a conventional design and construction. There is one significant difference, however; conventional excess flow valves are usually constructed to allow gas to leak past the valve when they are closed to equalize pressures and reopen the valve when normal conditions again exist. In the present device it is preferred to employ an excess flow valve which seals so that once the valve closes it remains closed unless upstream pressure is completely dissipated.

The force of flowing fluid acts upon the valve member 24 to slam it closed against the seat 23 in the event that an excess flow occurs. If desired the valve may be rendered adjustable by providing additional threads on the outer end of the stem 30. If this is done, tightening of the nut 31 moves the normal position of the member 24 closer to the port 23, thereby reducing the rate of flow at which the valve closes. It is usually preferred to coordinate the valve 24 to the rated flow capacity of the regulator, rather than providing an adjustment.

The safety valve 26 comprises a seat disc 33, a seat disc retainer 34, a spring 35 and a spider 36. The seat disc 33 is preferably formed of a suitable elastomer material such as neoprene or buna N, and the retainer 34 may be machined from fluted bar stock to provide passageways 37 around the edge of the retainer. This valve is adjustable by screwing the spider 36 in or out in the threads 38 to vary the compression of the spring 35.

In the event that the pressure in the passageway 21 exceeds the setting of the safety valve, the seat disc 33 is lifted away from the port 40 to allow gas to flow out through the passage 25. Thereafter the action of the valve is such that it closes at a substantially lower pressure than the opening pressure. Thus, when high pressure is applied, the valve pops open and remains open until the pressure is substantially reduced to a safe value. The size of the valve is relatively small. In fact, much smaller than would otherwise be needed under other circumstances. Its action primarily is to relieve presures in the chamber of the regulator and to produce a quick and fast flow past the excess flow valve sufficient to cause immediate closure of the excess flow valve.

Assuming that a failure occurs in the regulator 10, either through rupture of the diaphragm 14 or failure of the valve member 13 to close the port 16 so that the pressure in the chamber 17 becomes excessive, the pressure in the service line will exceed a safe value causing the safety valve 26 to pop open. When this occurs gas flows out of the chamber 17 at a high rate as well as back from the service line and out through the passage 25. The rapid flow of gas from the chamber 17 causes the excess flow check valve 24 to close against the seat 23 immediately. Once this valve has closed, the increased pressure in the chamber 17, so long as it exists, holds this valve closed preventing all further flow. As soon as the excess flow check valve 24 closes the service line pressure falls to a safe level. The safety relief valve 26 again closes, and the flow of gas into the service line continues to be shut down until the upstream pressure is dissipated.

By way of example the following valve settings have proved very effective to protect a service line in a conventional liquefied petroleum gas dispensing system. The regulator 10 is set to deliver gas at a pressure of 11 inches of water column, and the safety valve 26 is set to open at a pressure of approximately 18 inches of water or approximately 1½ times the normal service pressure. The excess flow valve is set to close at a flow rate of 150 cubic feet per hour. The relief valve for effecting operation of the excess flow valve has a port size of ⅜ inch in diameter. Thus, when the pressure is enough to open the safety relief valve, the relief valve discharges at a rate of 150 cubic feet per hour or more, and does so long enough to induce instant closure of the excess flow valve.

With such operation it is evident that the device protects against large or continuing small flows of gas into the service line developing dangerous pressures. Such flows may be caused by improper seating of the regulator valve. On the other hand, where an excessive flow is caused by failure of the diaphragm or other mechanism of the regulator allowing the regulator valve to open wide under conditions tantamount to or including a break in the service line down-stream from the excess flow check valve, the flow effect may be so fast or quick that the excess flow check valve will close without operating the relief valve since operating pressure is not built up on the service line.

The regulator 10 is provided with the conventional safety relief valve assembly 41 in the diaphragm 14. The assembly comprises a small helical spring 42, a stem 43 and a valve member 44 to which the regulator inlet valve operating linkage 45 is attached. Under normal operation the various parts are positioned as shown, the helical spring acting through the stem to hold the member 44 tight against the diaphragm 14. However, should the pressure in the chamber 17 build up to an excessive value the spring 42 will be compressed allowing the diaphragm 14 to move away from the member 44 and allowing gas to flow through the central opening 46 in the diaphragm around the stem 43.

In regulators provided with the safety device 11 of this invention the diaphragm safety valve assembly normally does not operate until after the safety device 11 has, for the diaphragm valve 41 is preferably adjusted to open at a higher pressure than the safety valve 26. However, once the excess flow valve 24 has closed excess pressure in the regulator will be vented through the diaphragm valve assembly. The diaphragm valve assembly 41 may be eliminated if gas under relatively low supply pressure is to be supplied to the regulator 10. However, if the pressure of the gas supplied is sufficient to rupture the diaphragm 14 or otherwise damage the regulator it is preferred to utilize the conventional safety relief device 41 in addition to the device 11 of this invention.

In Figs. 2–5 a modified embodiment of the safety device 11a is illustrated. The modified device 11a is intended for use with a conventional regulator such as the regulator 10a, being constructed in the form of a separate fitting which is threadably received in the outlet passageway 51 of the regulator 10a. The device 11a is identical with the preferred embodiment with the exception of the fact that it is formed in a separate body 52 instead of in a boss on the regulator.

Although somewhat more expensive to fabricate due to its separate construction, the device 11a has even greater utility than the preferred embodiment, for it may be used at any convenient point in the service line or for that matter in any conduit for flowing fluid instead of only at the regulator.

Figure 6:
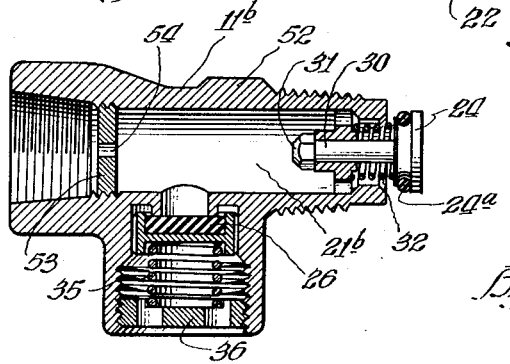
Fig. 6 is a section of a modified form of the safety device especially adapted for use with service conduits having a large volume.

Another modification 11b is shown in Fig. 6. This modification is particularly adapted for use in connection with relatively long service conduits. The difference between this embodiment and the embodiment 11a is that a flow restrictor in the form of an orifice plate 53 is provided downstream of the safety valve 26. The purpose of the restrictor is to speed up the action of the device in order to check gas flow as soon as excessive pressure is delivered and before the pressure in the entire service conduit has been built up. The size of the opening 54 in the orifice plate 53 is such that it offers somewhat more resistance to flow than excess flow check valve 24. As a result, should the regulator fail, pressure will build up quickly within the passage 21b causing the safety valve 26 to open. As soon as this valve opens the excess flow valve 24 closes just as in the preferred embodiment. Otherwise the operation of this modification is the same as the preferred form. Should the pressure build up slowly in the service line, the operation of the modified form is exactly the same as the preferred form.

From the foregoing it will be apparent that a greatly improved regulator and safety device has been provided which fulfills all the objects and advantages set forth herein. Moreover, the safety device of this invention may be used for a variety of purposes and a variety of fluids such as will suggest themselves to those familiar with the art. Furthermore, various changes and modifications such as will suggest themselves may be made without departing from the spirit of this invention, the scope of which is commensurate with the following claims:

What is claimed is:

1. In combination with a fluid pressure regulator for delivering fluid at a predetermined reduced pressure, said regulator having a pressure chamber therein, a safety device connected to said regulator and comprising a body having a passage therethrough in direct communication with said chamber for the flow of fluid at reduced pressure from said chamber, an excess flow check valve in said passage closing in the direction of fluid flow and constructed and arranged to completely arrest flow through said passage, the upstream face of said check valve being subject to the pressure of fluid flow, a safety relief valve mounted in a branch passage connecting said first passage to the atmosphere downstream and sufficiently close to said check valve that opening of said relief valve induces sufficient excess fluid flow through said check valve to effect a rapid closing of said check valve, said relief valve being adjustable to open at a pressure appreciably in excess of the predetermined delivery pressure, and said check valve being adjustable to remain closed until dissipation of upstream pressure.

2. In combination with a fluid pressure regulator for delivering fluid at a predetermined reduced pressure, said regulator having a pressure chamber therein, a safety device connected to said regulator and comprising a body having a passage therethough in direct communication with said chamber for the flow of fluid at reduced pressure from said chamber, an excess flow check valve in said passage closing in the direction of fluid flow, a valve seat in said passage, said valve being imperforate and said passage constituting the sole outlet from said chamber so that when said check valve is in sealing engagement with said valve seat flow from said chamber will be completely cut off, the upstream face of said check valve being subject to the pressure of fluid flow, a safety relief valve mounted in a branch passage connecting said first passage to the atmosphere downstream of and sufficiently close to said check valve that opening of said relief valve induces sufficient excess fluid flow through said check valve to effect a rapid closing of said check valve, said relief valve being adjustable to open at a pressure appreciably in excess of the predetermined delivery pressure, and said check valve being adjustable to remain closed until dissipation of upstream pressure.

3. In combination with a fluid pressure regulator for delivering fluid at a predetermined reduced pressure, said regulator having a pressure chamber therein, a safety device connected to said regulator and comprising a body having a passage therethrough in direct communication with said chamber for the flow of fluid at reduced pressure from said chamber, said body being separate from and removably connected to the wall of said chamber, an excess flow check valve in said passage closing in the direction of fluid flow, a valve seat in said passage, said valve being imperforate and said passage constituting the sole outlet from said chamber so that when said check valve is in sealing engagement with said valve seat flow from said chamber will be completely cut off, the upstream face of said check valve being subject to the pressure of fluid flow, a safety relief valve mounted in a branch passage connecting said first passage to the atmosphere downstream of and sufficiently close to said check valve that opening of said relief valve induces sufficient excess fluid flow through said check valve to effect a rapid closing of said check valve, said relief valve being adjustable to open at a pressure appreciably in excess of the predetermined delivery pressure, and said check valve being adjustable to remain closed until dissipation of upstream pressure.

4. In combination with a fluid pressure regulator for delivering fluid at a predetermined reduced pressure, said regulator having a pressure chamber therein, a safety device connected to said regulator and comprising a body having a passage therethrough in direct communication with said chamber for the flow of fluid at reduced pressure from said chamber, said body being separate from and removably connected to the wall of said chamber, an excess flow check valve in said passage closing in the direction of fluid flow, a valve seat in said passage, said valve being imperforate and said passage constituting the sole outlet from said chamber so that when said check valve is in sealing engagement with said valve seat flow from said chamber will be completely cut off, the upstream face of said check valve being subject to the pressure of fluid flow, a safety relief valve mounted in a branch passage connecting said first passage to the atmosphere downstream of and sufficiently close to said check valve that opening of said relief valve induces sufficient excess fluid flow through said check valve to effect a rapid closing of said check valve, said relief valve being adjustable to open at a pressure appreciably in excess of the predetermined delivery pressure, said check valve being adjustable to remain closed until dissipation of upstream pressure, and a flow restricting orifice plate mounted in said passage downstream of said relief valve.

References Cited in the file of this patent

UNITED STATES PATENTS

| | | |
|---|---|---|
| 725,015 | Zehnder | Apr. 7, 1903 |
| 869,878 | Bruckner | Nov. 5, 1907 |
| 1,001,510 | Curbey | Aug. 22, 1911 |
| 1,060,142 | Stevens | Apr. 29, 1913 |
| 2,268,733 | Williams | Jan. 6, 1942 |
| 2,356,410 | Krugler | Aug. 22, 1944 |
| 2,478,210 | Sprague | Aug. 9, 1949 |
| 2,557,187 | Hanssen | June 19, 1951 |

FOREIGN PATENTS

| | | |
|---|---|---|
| 48,208 | Sweden | of 1920 |